(12) United States Patent
Schwan et al.

(10) Patent No.: US 10,539,223 B2
(45) Date of Patent: Jan. 21, 2020

(54) GEAR UNIT HAVING A SHAFT, A FLANGE PART, AND A HOUSING PART

(71) Applicant: SEW-EURODRIVE GMBH & CO. KG, Bruchsal (DE)

(72) Inventors: Tobias Schwan, Wiesloch (DE); Peter Barton, Bretten (DE); Jan Knittel, Dettenheim (DE); Peter Eller, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 126 days.

(21) Appl. No.: 15/566,562

(22) PCT Filed: Mar. 7, 2016

(86) PCT No.: PCT/EP2016/000400
§ 371 (c)(1),
(2) Date: Oct. 13, 2017

(87) PCT Pub. No.: WO2016/165802
PCT Pub. Date: Oct. 20, 2016

(65) Prior Publication Data
US 2018/0119794 A1      May 3, 2018

(30) Foreign Application Priority Data

Apr. 13, 2015   (DE) .................. 10 2015 004 509
Sep. 1, 2015    (DE) .................. 10 2015 011 163

(51) Int. Cl.
*F16H 57/04*     (2010.01)
*F16H 57/031*    (2012.01)
(Continued)

(52) U.S. Cl.
CPC ....... *F16H 57/0416* (2013.01); *F16H 57/021* (2013.01); *F16H 57/031* (2013.01); *F16H 57/0495* (2013.01); *F16H 2057/02034* (2013.01)

(58) Field of Classification Search
CPC ............. F16H 57/0415; F16H 57/0416; F16H 57/0417; F16H 57/03; F16H 57/0413;
(Continued)

(56) References Cited

U.S. PATENT DOCUMENTS 2,756,614 A    7/1956   Kobayashi
3,417,636 A    12/1968  Randolph

FOREIGN PATENT DOCUMENTS

DE         1298819 B       7/1969
DE    102012000682 A1  *  7/2013  ............. F04D 29/36

OTHER PUBLICATIONS

Machine Translation of DE 10 2012 000 682, obtained Apr. 12, 2019.*

(Continued)

*Primary Examiner* — Richard W Ridley
*Assistant Examiner* — Brian J McGovern
(74) *Attorney, Agent, or Firm* — Hunton Andrews Kurth LLP

(57) ABSTRACT

A gear unit includes a shaft, in particular an input shaft, a flange part and a housing part. The input shaft is supported by bearings in the housing part, and a fan is connected to the shaft in a torsion-proof manner. The housing part includes cooling fins, in particular cooling fins that extend in the axial direction, i.e. in the axis direction of the shaft, the cooling fins have an offset and/or stepped configuration, and the flange part surrounds the offset or stepped region of the cooling fins, in particular in the manner of a housing.

12 Claims, 4 Drawing Sheets

(51) Int. Cl.
*F16H 57/021* (2012.01)
*F16H 57/02* (2012.01)

(58) Field of Classification Search
CPC .... F16H 57/0412; F16H 57/04; F16H 57/031;
F16H 57/029
See application file for complete search history.

(56) References Cited

OTHER PUBLICATIONS

International Search Report dated Jun. 1, 2016, in International Application No. PCT/EP2016/000400. (English-language translation).
International Preliminary Report on Patentability, dated Oct. 17, 2017, in International Application No. PCT/EP2016/000400. (English-language translation).

* cited by examiner

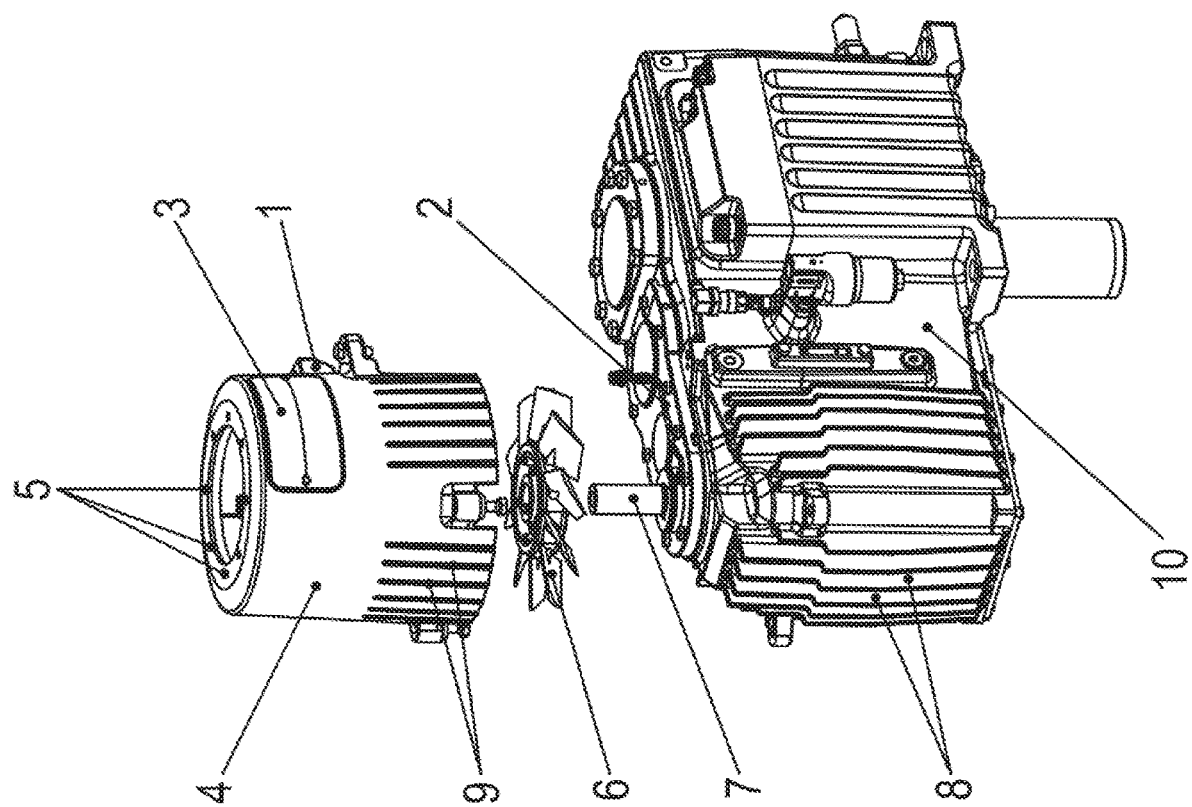

GEAR UNIT HAVING A SHAFT, A FLANGE PART, AND A HOUSING PART

FIELD OF THE INVENTION

The present invention relates to a gear unit, which has a shaft, a flange part and a housing part.

BACKGROUND INFORMATION

It is generally known that fans may be used for cooling devices.

SUMMARY

Example embodiments of the present invention provide a gear unit, which includes a shaft, a flange part and a housing part, so that effective cooling is able to take place and the operation is uncomplicated.

According to an example embodiment of the present invention, a gear unit includes a shaft, in particular an input shaft, a flange part and a housing part are that the input shaft is supported in the housing part with the aid of bearings. A fan is connected to the shaft in a torsionally fixed manner. The housing part includes cooling fins, in particular cooling fins that extend in an axial direction, i.e., in the axial direction of the shaft. The cooling fins are arranged in an offset and/or stepped manner, and the flange part surrounds the offset or stepped region of the cooling fins, in particular in the manner of a housing.

This has the advantage that a well-defined placement of the flange part on the housing part is able to be provided. In addition, the airflow supplied by the fan is able to be guided between the cooling fins and the flange part. Better cooling of the housing part is therefore achievable.

Furthermore, an integrated safety guard may be provided in that the flange part covers the offset region of the cooling fins and thereby prevents rotatably mounted parts from being touched.

The airflow supplied by the fan may flow between the flange part and the cooling fins. This is considered advantageous in that individual channels are created, which are delimited by cooling fins and the housing part as well as by the flange part in each case. The exiting airflow is thus directed toward the housing part and therefore cools it in an effective manner. The cooling fins may guide this exiting airflow along the housing.

The flange part may have on its external surface a recess through which the airflow enters. This has the advantage that the aspirated air enters radially and the fan is therefore able to be arranged as an axial fan.

The recess may be sealed by a perforated plate that is connected to the flange part, especially with the aid of screws, the diameter of the holes in particular being smaller than the diameter of a human finger. This is considered advantageous inasmuch as a safety guard is provided realized.

The axial region covered by the flange part may overlap with the axial region covered by the cooling fins, the overlap region in particular having a wider extension than the length of a human finger. This offers the advantage that the flange part has a region that resembles an apron, which surrounds the offset region of the cooling fins and thus delimits the air channels, the flange part smoothly adjoining the cooling fins of the housing in the axial direction.

Each cooling fin that is disposed on the housing and whose covered radial clearance region may overlap with the radial clearance region covered by the flange part, may be allocated a projection disposed on the flange part, in particular in an unambiguous manner, and the respective projection may be disposed at the same peripheral angle position as the respectively allocated cooling fin. This has the advantage of providing a smooth transition from the flange part to the housing part in an axial direction, thereby also reducing the risk of injury.

The respective projection may be arranged as a cooling fin, which is formed on the flange part, in particular. This is considered advantageous in that the cooling is improved.

A connection device, in particular a lubricating nipple, may be fixed in place on the flange part, and a tube may be mounted on the housing part. This has the advantage that lubricating grease is able to be supplied in an uncomplicated manner and the lubricant supply may be implemented on the flange part even though the bearing to be lubricated is accommodated by the housing part.

The flange part may be placed so as to be situated on the offset region or the step. This has the advantage of allowing a simple alignment and centering of the flange part.

Example embodiments of the present invention are explained in greater detail below with reference to the Figures.

BRIEF DESCRIPTION OF THE DRAWINGS

FIG. 4 shows an oblique view onto the exploded gear unit.

DETAILED DESCRIPTION

Figure 1:
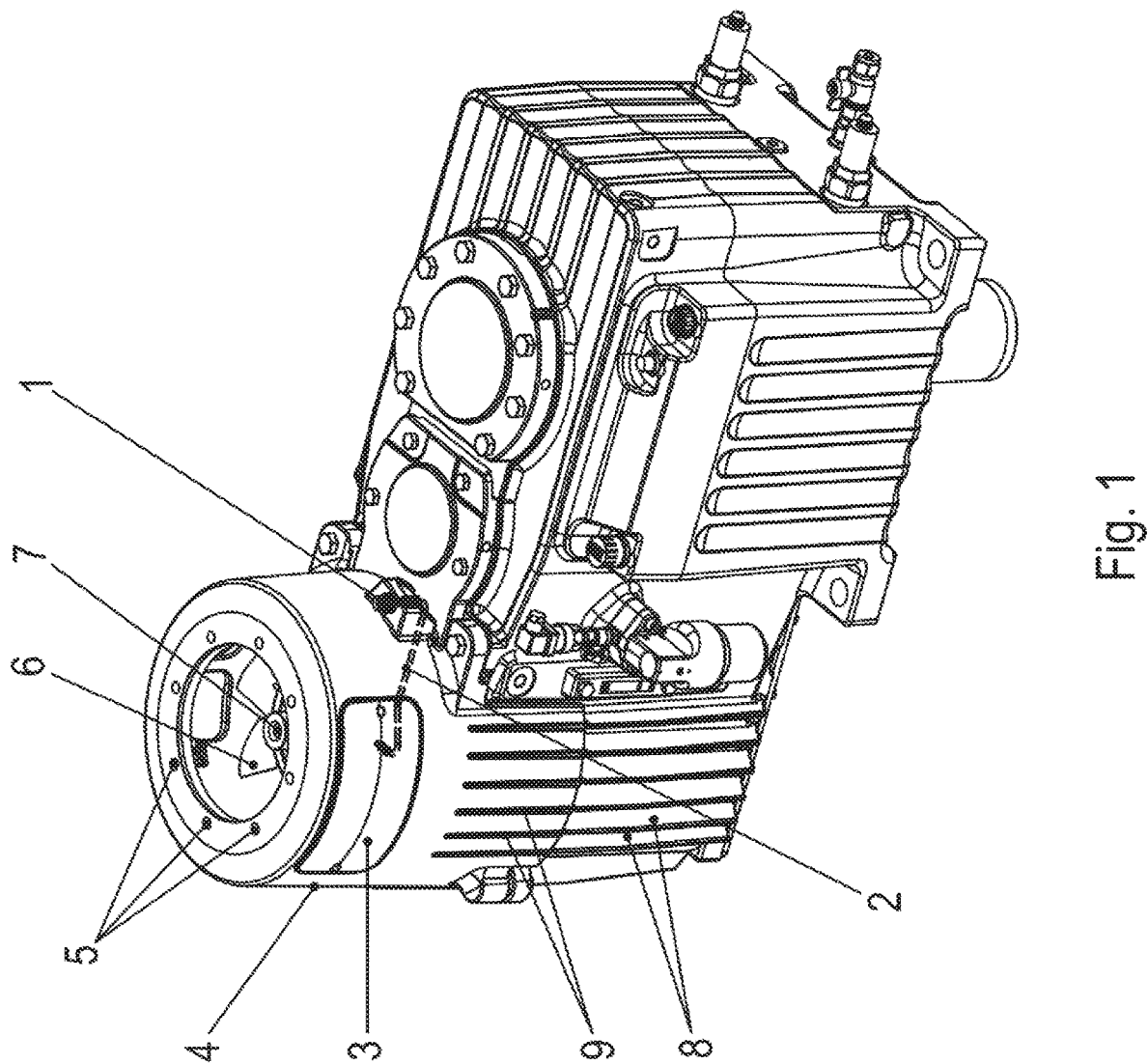
FIG. 1 shows a gear unit according to an example embodiment of the present invention including flange part 4 in an oblique view.
Figure 2:
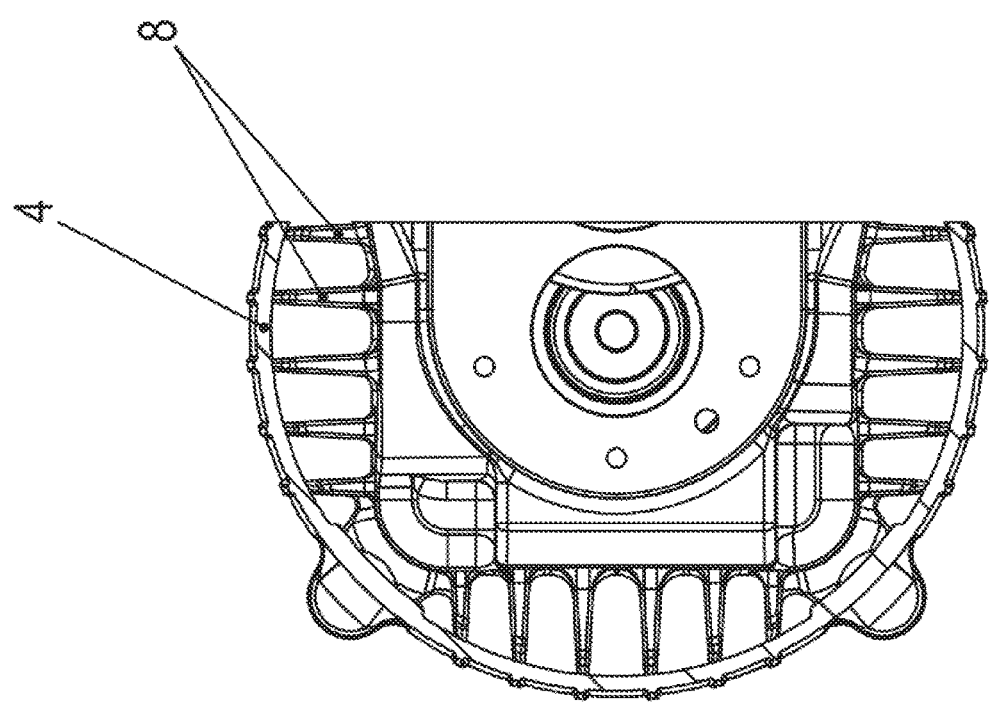
FIG. 2 shows a cross-section through flange part 4.
Figure 3:
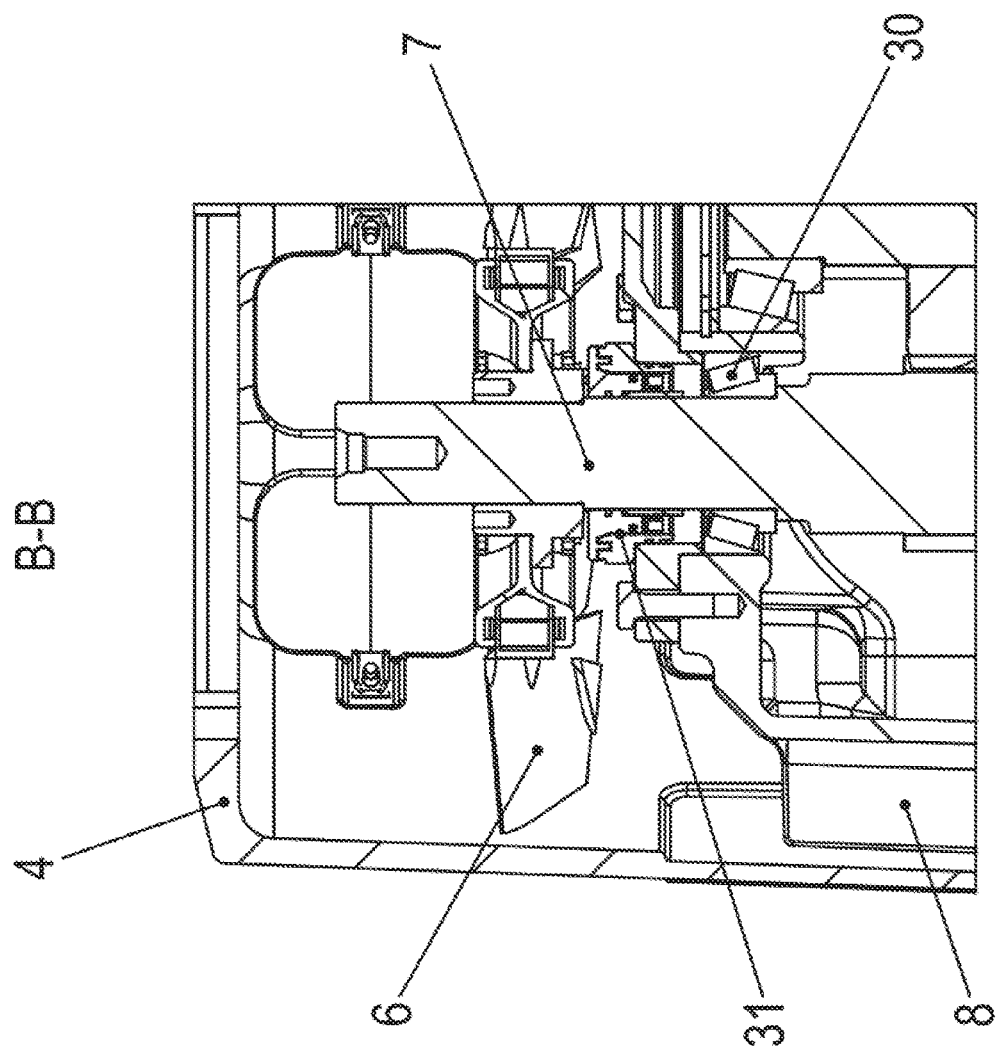
FIG. 3 shows an enlarged cutaway of a longitudinal section through flange part 4.

As illustrated in the Figures, the gear unit according to an example embodiment of the present invention has a housing part 10, which is connected to flange part 4 with the aid of screws.

Flange part 4 is generally arranged in the form of a hollow cylinder and surrounds input shaft 7 and a fan 6 that is connected to it in a torsionally fixed manner.

At the first axial end of flange part 4, i.e. viewed in the axis direction of input shaft 7, flange part 4 is connected to housing part 10. At the other axial end of flange part 4, an adapter or an electric motor may be connected by screws. Flange part 4 includes bores 5 for such a screwed connection, which are set apart from one another at regular intervals in the circumferential direction and are situated at the same radial clearance in each case.

Housing part 10 includes cooling fins, which extend in the axial direction and are arranged at an offset, meaning that the extension of the greatest radial clearance of cooling fins 8 has a stepped form in the axial direction.

Via its first axial end, flange part 4 sits on the step formed in this way or on the offset region formed in this manner.

Allocated to each axially extending cooling fin 8 of housing part 10 that is disposed in the radial clearance region covered by flange part 4 or overlaps therewith is an individual projection 9, which is situated at the same peripheral angle position as the cooling fin 8 allocated in each case. The radial clearance region covered by respective projection 9 overlaps with or is encompassed by the radial clearance region covered by the respectively allocated cooling fin 8.

Projections 9 also extend in the axial direction, or in other words, are aligned in parallel or even coaxially with the respective cooling fins 8.

On its external surface, flange part 4 includes a recess that is covered by a perforated plate 3. The fan is therefore able to be arranged as an axial fan, which aspirates the air arriving from the radial direction and then supplies it in an axial direction into the interspaces between cooling fins 8.

Thus, the air is aspirated laterally and carried in the axial direction, parallel to the extension direction of cooling fins 8, thereby allowing effective cooling of housing part 10. However, flange part 4 is also cooled by projections 9.

Input shaft 7 is supported in housing part 10 by bearings 30 and sealed with the aid of a contact-free seal 31, in particular a labyrinth seal. However, this seal 31 requires lubrication, in particular using lubricating grease.

As illustrated in FIG. 4, a tube, which leads to seal 31, is fixed in place on housing part 10 for this purpose.

A connection device 1, in particular a lubricating nipple, is disposed at a radially projecting section of flange part 4.

Prior to the installation of the gear unit, connection device 1 is therefore disposed on flange part 4 in preassembled form and is connected to flange part 4; tube 2 is preassembled with housing part 10 and connected thereto.

During the installation of the gear unit, flange part 4 is placed on top of housing part 10 and may come to lie against the step of the cooling fins in the process. Connection device 1 is also sealingly connected to the tube during this placement.

As a result, it is possible to supply the lubricating grease for the contact-free seal at flange part 4 even though tube 2 is fixed in place on housing part 10.

After flange part 4 has been placed on the step of cooling fins 8, flange part 4 surrounds the stepped region of cooling fins 8. The airflow supplied by the fan flows between and through cooling fins 8 and flange part 4. The axial region covered by flange part 4 overlaps with the axial region covered by cooling fins 8. The overlap region has a wider extension in an axial direction than a human finger. This prevents people from touching rotating parts from the outside.

The airflow exiting from the intermediate space between flange part 4 and cooling fins 8 is guided further along housing part 10, in particular between cooling fins 8 in the axial direction. This makes it possible to carry out effective cooling of housing part 10.

Additional shafts, in particular also the output shaft, are mounted in housing part 10. Input shaft 7 is connected to a toothed part in a torsionally fixed manner. In the same manner, the additional shafts are also connected to at least one toothed part in a torsionally fixed manner in each case. Lubricating oil lubricates the toothed parts that are in engagement.

Perforated plate 3 is provided with holes that are so small that no human finger can fit through them.

After the adapter and/or the motor has/have been mounted by installing screws in bores 5, the recess of flange part 4, which is upwardly open in FIG. 1, is sealed.

A human finger here always denotes a finger having standard measurements.

Tube 2 may be produced from a bendable material such as copper or steel.

Perforated plate 3 may be produced from steel sheet in the form of a punched and bent part.

Flange part 4, in particular a lantern flange, may be made from steel.

Housing part 10 may be produced from steel or cast steel. Here, a multipart configuration may also be provided in that the respective individual parts are tightly connected to one another. As an alternative, housing part 10 is produced as a single piece so that the expenditure for seals is reduced. However, the form of housing 10 must then be less complex.

LIST OF REFERENCE NUMERALS

1 connection device, in particular lubricating nipple
2 tube
3 perforated plate
4 flange part, in particular lantern flange
5 bores
6 fan
7 input shaft
8 cooling fins
9 projections, in particular cooling fins
10 housing part
30 bearing
31 contactless seal, in particular labyrinth seal

The invention claimed is:

1. A gear unit, comprising:
a shaft;
a flange part;
a housing part;
at least one bearing provided in the housing part and supporting the shaft; and
a fan connected to the shaft in a torsionally fixed manner;
wherein the housing part includes stepped cooling fins, and the flange part surrounds a stepped region of the stepped cooling fins
wherein the flange part includes projections projecting radially outwardly from the flange part, each of the projections corresponding to a respective one of the stepped cooling fins and being disposed at a respective same peripheral angle position as the respective one of the stepped cooling fins.

2. The gear unit according to claim 1, wherein the shaft is arranged as an input shaft.

3. The gear unit according to claim 1, wherein the stepped cooling fins extend in an axial direction and/or in an axis direction of the shaft.

4. The gear unit according to claim 1, wherein the flange part surrounds the stepped region of the stepped cooling fins to form a housing.

5. The gear unit according to claim 1, wherein the fan is adapted to supply an airflow between the flange part and the stepped cooling fins.

6. The gear unit according to claim 1, wherein an external surface of the flange part includes a recess arranged for entry of an airflow.

7. The gear unit according to claim 6, further comprising a perforated plate sealing the recess, the perforated plate connected and/or screw connected to the flange part.

8. The gear unit according to claim 1, wherein an axial region covered by the flange part overlaps with an axial region covered by the cooling fins.

9. The gear unit according to claim 1, wherein the projections are arranged as cooling fins.

10. The gear unit according to claim 1, further comprising a connection device fixed in place on the flange part, and a tube fixed in place on the housing part.

11. The gear unit according to claim 10, wherein the connection device includes a lubricating nipple.

12. The gear unit according to claim 1, wherein the flange part is arranged on the stepped region.

\* \* \* \* \*